United States Patent [19]
Silberstein

[11] Patent Number: 4,874,066
[45] Date of Patent: Oct. 17, 1989

[54] VARIABLE FLOW SHOCK ABSORBER AND METHOD
[75] Inventor: Ilan Silberstein, Tiburon, Calif.
[73] Assignee: S.U.I. Corporation, Tiburon, Calif.
[21] Appl. No.: 311,082
[22] Filed: Feb. 14, 1989

Related U.S. Application Data
[63] Continuation of Ser. No. 128,588, Dec. 4, 1987.

[51] Int. Cl.$^4$ ............................................. F16E 9/34
[52] U.S. Cl. .................................... 188/280; 188/282; 188/322.15; 137/514.5; 137/517; 137/538
[58] Field of Search ............ 188/280, 282, 317, 322.15; 137/514.5, 517, 538; 267/127; 280/714

[56] References Cited
U.S. PATENT DOCUMENTS

| 383,877 | 6/1888 | Gale et al. ............................ 137/517 |
| 1,216,221 | 2/1917 | Erickson et al. .............. 188/317 X |
| 2,973,061 | 2/1961 | Rumsey ............................... 188/280 |
| 4,596,321 | 6/1986 | Harper et al. ................... 188/322.15 |

FOREIGN PATENT DOCUMENTS

| 44-29008 | 11/1969 | Japan . | |
| 1025940 | 6/1983 | U.S.S.R. ......................... 188/322.15 |
| 400382 | 10/1933 | United Kingdom ................ 188/280 |

Primary Examiner—George E. Halvose
Attorney, Agent, or Firm—Thomas R. Lampe; Glen R. Grunewald

[57] ABSTRACT

A shock absorber including a piston with two relatively movable elements defining a variable-sized, fluid-filled space. The size of the space is decreased when subjected to external fluid pressure and fluid flow through the piston is modified in response to such decrease.

9 Claims, 2 Drawing Sheets

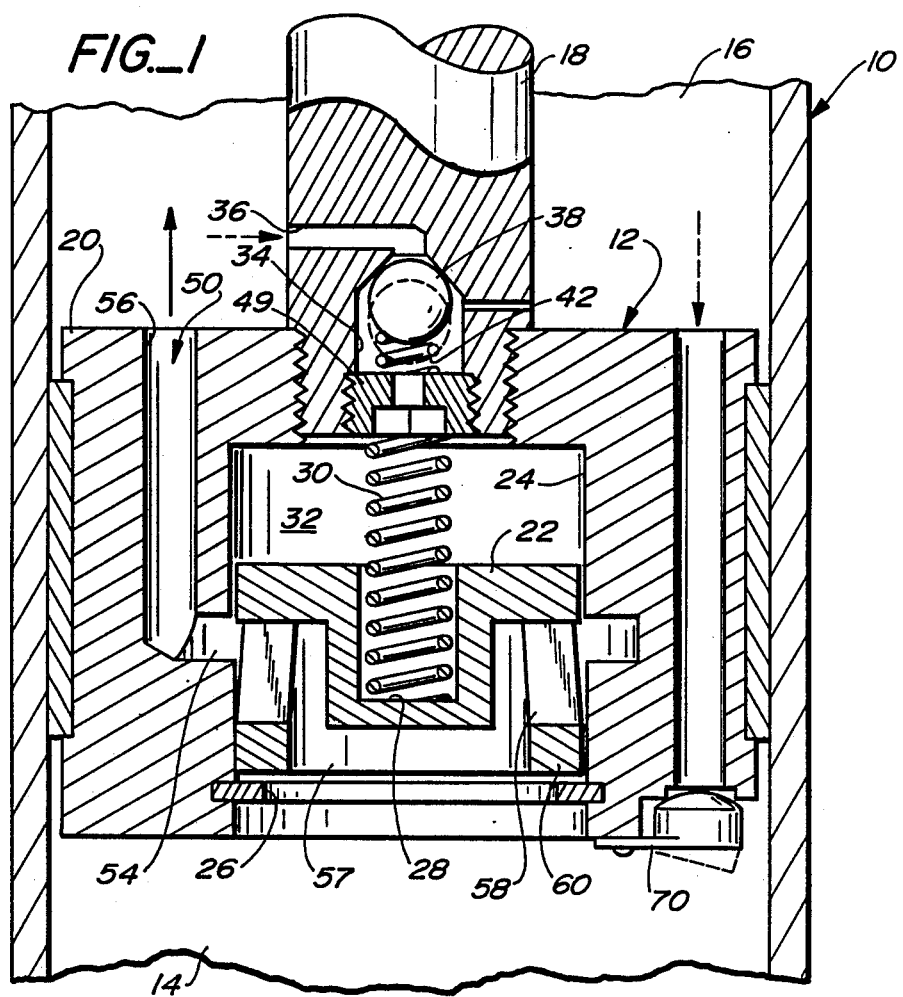
FIG._1
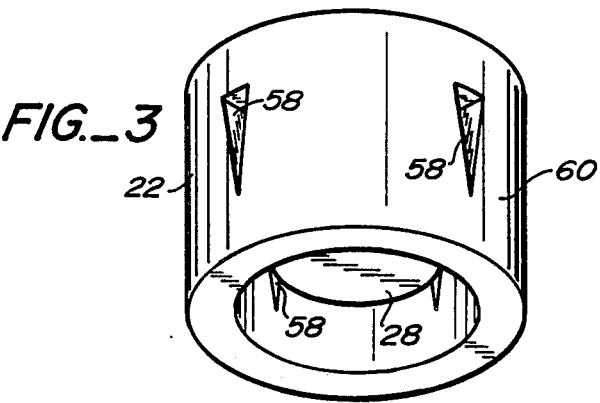
FIG._3

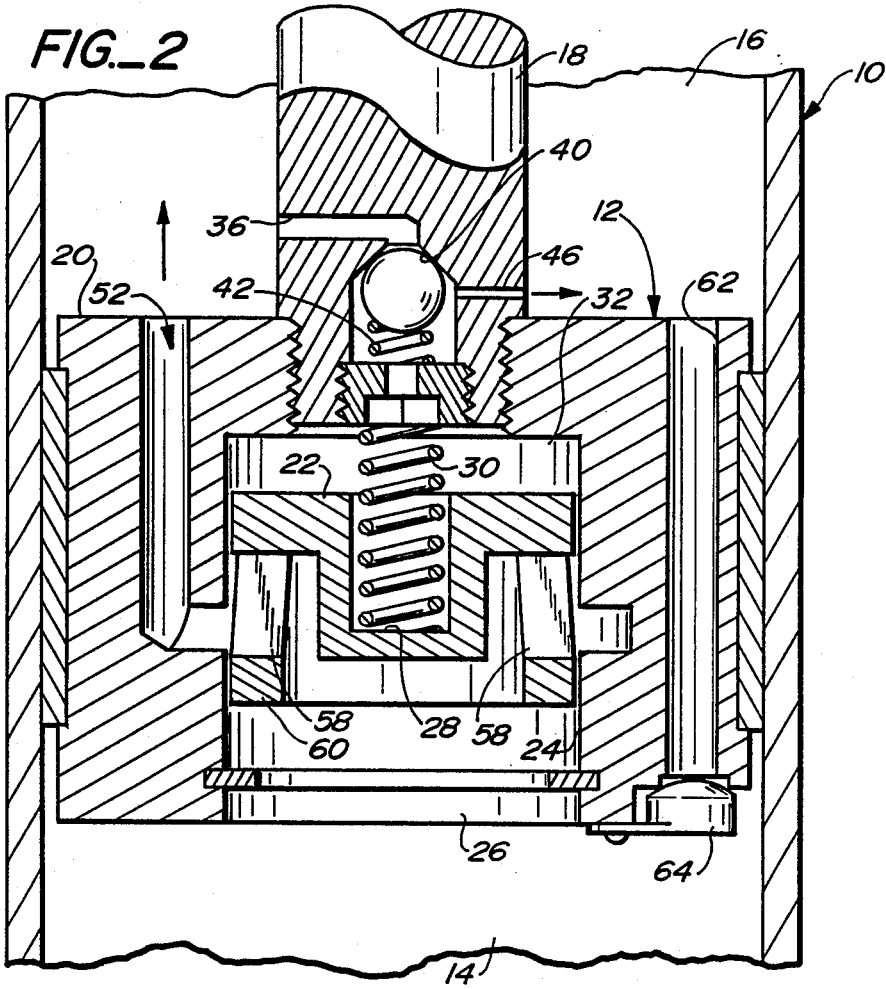
FIG._2
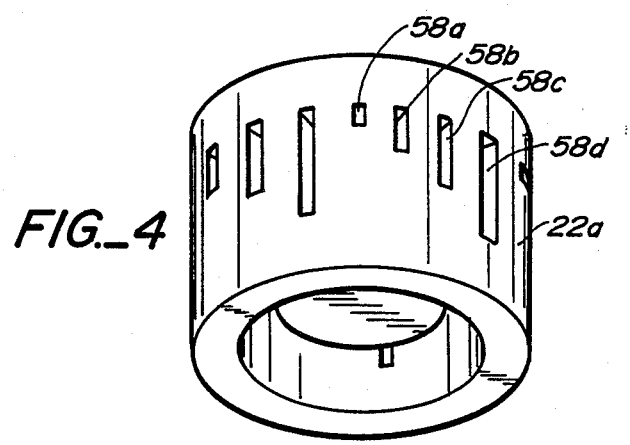
FIG._4

VARIABLE FLOW SHOCK ABSORBER AND METHOD

This application is a continuation of application Ser. No. 128,588 filed Dec. 4, 1987.

TECHNICAL FIELD

This invention relates to a shock absorber for use with motor vehicles and the like. The shock absorber has damping characteristics which vary responsive to differing road conditions.

BACKGROUND ART

Conventional motor vehicle shock absorbers typically incorporate a fluid-filled cylinder with a piston slidably disposed therein. Passageways are formed in the piston which restrict fluid flow between chambers on opposite sides of the piston. This serves to damp the motion of the piston relative to the cylinder. Representative prior art approaches are disclosed in U.S. Pat. Nos. 1,281,041, 2,410,992, 4,325,468, 4,474,271, 4,515,252, and 4,588,053. U.S. Pat. No. 2,393,559 discloses a somewhat similar approach utilized in connection with a timing device for use with dishwashing machines and the like.

Generally speaking, it is preferred that shock absorbers exhibit a low damping characteristic under normal conditions, thus providing a soft ride on relatively smooth road surfaces. On the other hand, the shock absorber should have the capacity to dampen severe shocks when the vehicle encounters adverse conditions such as potholes or raised obstructions in the roadway.

It is known to provide switchover from a low damping characteristic to a high damping characteristic in a shock absorber as a function of the position of the piston within the associated cylinder. That is, shock absorbers have been constructed in such a way as to provide a low damping characteristic when the piston is centrally located within the cylindar and a high damping characteristic when the piston approaches an end of the cylinder. Generally speaking, however, such arrangements are complex and expensive. For this reason they have not lent themselves to automobile use, but only to applications such as airplanes or industrial uses. In any event, shock absorbers of this type of construction are not always desirable or appropriate, as when, for example, a severe cavity or a particularly large raised obstruction is encountered in the roadway. Under such conditions it is possible that damage to the vehicle may occur by failure of the piston to exert a large damping force before it approaches the extremity of its stroke. At the very least, the occupants of the vehicle will be discomforted.

U.S. Pat. No. 4,610,332 illustrates a form of shock absorber piston valve which normally provides a low amount of damping but will switch into high damping mode when such is needed regardless of the positioning of the piston in its associated cylinder. This is accomplished by a relatively complex valving arrangement employing frusto-conical valve element in the piston to control the ports thereof. The valve element distorts under differing conditions to provide the desired effect. More specifically, the valve element provides a by-pass passage between one chamber of the shock absorber to another during a low velocity stroke of the piston but is sufficiently resilient to become seated and close off the by-pass passage in response to a relatively high velocity stroke. In this latter condition, all fluid is forced through the rebound port and the normal rebound valve to provide higher damping than when the by-pass passage is open. The reliability of such an arrangement which depends upon the repeated flexing of a relatively thin mechanical element is certainly problematical, and the fine tolerances which would have to be employed to ensure reasonable consistency of operation would make manufacture of such a unit an expensive matter. Another difficulty is the size of a piston incorporating this mechanism which, by necessity, is bulky and will unduly restrict the travel capacity of a shock absorber.

DISCLOSURE OF THE INVENTION

The present invention also relates to a shock absorber which provides variable damping when needed, independent of the positioning of the shock absorber piston in its associated cylinder. The shock absorber is of relatively simple, inexpensive construction, reliable, and capable of repeated use under demanding conditions without failure. The shock absorber of the present invention employs relatively few moving mechanical parts and does not incorporate components requiring exacting mechanical tolerances to function in a predetermined uniform manner. Further, the invention does not require an enlarged piston which will unduly affect the travel capacity of a shock absorber.

According to the teachings of the present invention, a piston of a specified character is mounted within a cylinder having fluid therein. The piston defines first and second chambers in the cylinder and a primary passageway permitting the flow of fluid from the first chamber into the second chamber as fluid is pressurized in the first chamber by movement of the piston. The piston includes relatively moveable first and second piston elements defining a variable-sized, fluid-filled space in communication with a chamber through a vent.

The second piston element is displaceable relative to the first piston element when pressure of the fluid in the first chamber reaches a predetermined level to reduce the size of the space and force fluid from the space through the vent into the communicating chamber. The piston elements include means cooperable to decrease the effective size of the primary passageway substantially simultaneously with the reduction of the size of the space.

BRIEF DESCRIPTION OF THE DRAWINGS

FIG. 1 is a cross-sectional, side elevational view of a piston constructed in accordance with the teachings of the present invention disposed within a cylinder and in a low damping mode;

FIG. 2 is a view similar to FIG. 1 with the piston in a high damping mode;

FIG. 3 is a perspective view of an element of the piston; and

FIG. 4 is a perspective view of a modified form of the element of FIG. 3.

BEST MODE FOR CARRYING OUT THE INVENTION

Referring now to the drawing, a preferred form of shock absorber constructed in accordance with the teachings of the present invention is illustrated. The shock absorber includes a cylinder 10 filled with fluid as is conventional. A piston 12 is mounted within the interior of the cylinder, defining a first chamber 14 on one side of the piston and a second chamber 16 on the other side thereof. It will be appreciated that cylinder 10 is adapted to be fixed to one member of vehicle (not shown) while the piston rod 18 attached to piston 12 is adapted to be affixed to another, relatively moveable member. For example, the cylinder could be fixed to an unsprung member such as a suspension arm and the piston rod fixed to a sprung member such as a chassis frame.

Piston 12 includes a first piston element 20 and a second piston element 22. First piston element 20 defines a cylindrically-shaped recess 24 within which the second piston element 22 is slidably disposed. Suitable means such as a annular stop 26 attached to piston element 20 and projecting into recess 24 is employed to maintain piston element 22 within the recess. Second piston element 22 defines a generally cup-like receptacle 28 within which a coil compression spring 30 is positioned. The compression spring 30 bears against first piston element 20 at the top of the recess to continually urge second piston element 22 in the direction of first chamber 14.

First and second piston elements 20, 22 thus define a space 32 within which spring 30 is disposed. Space 32 is filled with the same fluid occupying the interior of cylinder 10. the cup-like recess allows for the accommodation of spring 32 without adding to the over-all length of piston 12.

A throughbore 34 is formed in piston rod 18, said throughbore leading from space 32 to second chamber 16 through a port 36 in the periphery of piston rod 18. Check valve means is incorporated in the piston rod. The check valve means includes a ball valve 38 urged against a conical seat 40 partially defining the throughbore 34 by a coil spring 42. An apertured valve cage 44 at the lower end of the piston rod retains spring 42 and ball valve 38 in operative position. It will be appreciated that the check valve means is a one way valve, permitting passage of fluid through port 36 only when the fluid within chamber 16 is sufficiently pressurized to dislodge ball valve 38 from seat 40. This only occurs when piston 12 is moving in the direction of second chamber 16.

A vent 46 is formed in piston rod 18 below valve seat 40 so that the vent is always in communication with space 32 regardless of the direction of movement of piston 12 within cylinder 10. When the size of space 32 is lessened by second piston element 22 moving further into recess 24, fluid within the space will be vented through vent 46 into second chamber 16.

A primary passageway 50 is formed in piston 12. In the embodiment illustrated, primary passageway 50 has two components. The first component is flow path 52 defined by first piston element 20, including a groove 54 formed about the periphery of recess 24 and a channel 56 leading from the groove through the first piston element 20 to second chamber 16. The other component of the disclosed form of primary passageway 50 is a plurality of apertures 58 formed in the downwardly extending peripheral wall 60 of second piston element 22 and opening 57 communicating with first chamber 14.

Each aperture 58 has a generally wedge-shaped configuration with the narrow end of the generally wedge-shaped configuration oriented in the direction of the first chamber 14. When the second piston element 22 abuts annular stop 26, that is, when the size of space 32 is at its maximum, as shown in FIG. 1, the widest end of the wedge-shaped aperture 58 is in general alignment with the top of groove 54 so that the effective size of the primary passageway 50 is at its maximum. When, however, second piston element 22 moves within recess 24 in the direction of second chamber 16, as shown in FIG. 2, the effective size of the primary passageway will be reduced because groove 54 will be in registry with a smaller area of each aperture 58.

The operation of the aforedescribed structure is as follows. Under normal conditions, that is, when low damping is desired, any downward movement of piston 12 within cylinder 10 will be relatively slow. Fluid in first chamber 14 will pass in unrestricted fashion through primary passageway 50 to second chamber 16 with the effective size of the primary passageway being at its maximum. This is the mode or condition illustrated in FIG. 1. If, however, the vehicle with which the shock absorber is utilized encounters road condition resulting in rapid movement of piston 12 in the direction of first chamber 14, a greater pressure will build up in first chamber 14, and such pressure will force second piston element 22 in the direction of second chamber 16 against the urging of spring 30, as shown in FIG. 2.

The rate at which this occurs will be controlled due to the fact that fluid within space 32 must exit relatively restricted vent 46 when the size of space 32 diminishes. As space 32 diminishes in size, apertures 58 will be displaced relative to groove 54 and a smaller and smaller area of each aperture will be in registry with the groove the further second piston element 22 moves into recess 24. Because the effective size of primary passageway 50 is diminished by this action, the piston will encounter greater resistance and a larger damping characteristic will result. Because of the wedge-shape of apertures 58, the change over from low damping to high damping will be a gradual one and the positioning of second piston element 22 relative to first piston element 20 will constantly change in response to external forces. In essence, the degree of damping is a direct function of the velocity of movement of the piston in the direction of first chamber 14. Also, the rate of change in damping stiffness is proportional to the severity of the road disturbance. The differential in pressure between chambers 14 and 16 increases with the severity of such disturbance so that the rate at which fluid is squeezed from space 32 also increases. It will be appreciated that the size of vent 46 also controls the rate at which fluid exits space 32 and the designer can select this size to obtain the desired transition from low to high damping.

After the shock is encountered and a rebound of piston 12 in the direction of second chamber 16 takes place, it is desirable that this recovery action be as quick as possible. This means that fluid should be allowed to flow from second chamber 16 to first chamber 14 through piston 12 as quickly as possible. When piston 12 moves in the direction of second chamber 16, ball valve 38 will be withdrawn from seat 40, as shown by dash lines in FIG. 1, and second piston element 22 will quickly move back into abutment with annular stop 26. Spring 30 facilitates this return but, of course, higher fluid pressure in second chamber 16 as compared to first chamber 14 will accomplish this in any event. When piston element 22 engages stop 26, fluid will flow freely through primary passageway 50. In addition, fluid will flow from chamber 16 to chamber 14 through a secondary passageway 62 formed in the piston since a valve 64 associated with such passageway opens when piston 12 moves in the direction of second chamber 16. Valve 64 was of course closed when piston 12 moved toward second chamber 14. Any suitable one way valve may be used for this purpose. In the illustrated embodiment, the valve is biased toward closed (solid line) position by leaf spring 70. Pressure of fluid in the secondary passageway will move valve 64 to the open position illustrated by dash lines in FIG. 1.

It will be appreciated that changes may be made to the disclosed embodiment without departing from the spirit or scope of the present invention. For example, the vent and check valve means disposed in the piston rod may be located in the piston itself as may the port 36. In addition, changes may be made with respect to apertures 58 to attain the desired results. For example, the shape of the wedge can be varied for particular shock absorbers to obtain desirable transition characteristics between high and low damping.

For that matter, the apertures need not necessarily be wedge-shaped to accomplish the desired result of gradual transition between high and low damping. One possible alternative arrangement would be to employ apertures of constant cross section but with each aperture being of a different length. In this manner, less total aperture area would be in registry with groove 54 as the piston element moves into the recess 24. Such an arrangement is shown in FIG. 4, wherein the second piston element is designated by reference numeral 22a and the variable length apertures by reference numerals 58a–d.

What is claimed is:

1. A shock absorber comprising, in combination:
   a cylinder having an interior with fluid therein;
   a piston rod;
   a piston mounted within said cylinder interior defining first and second chambers in said cylinder and a primary passageway permitting the flow of fluid from said first chamber into said second chamber as fluid is pressurized in said first chamber by movement of said piston, said piston including relatively moveable first and second piston elements defining a variable-sized, fluid-filled space in continuous communication with said second chamber through a fluid-flow restricting vent spaced from said primary passageway, formed in said shock absorber, and providing communication between said space and said second chamber, said first piston element being fixedly mounted relative to said piston rod, movable with said piston rod, and defining a recess, and said second piston element having a peripheral wall at least partially disposed within said recess and said second piston element being gradually displaceable relative to said first piston element toward said piston rod within said recess responsive to pressurization of fluid in said first chamber to force the fluid in said space through said fluid-flow restricting vent and into said second chamber whereby the size of said space is gradually reduced as a function of the amount of fluid forced through said fluid-flow restricting vent, said primary passageway including at least one flow path defined by said first piston element and communicating with said recess and at least one aperture defined by said second piston element in the peripheral wall thereof in communication with said flow path, relative movement of said piston elements gradually displacing said aperture relative to said flow path to gradually modify the effective size of said primary passageway in response to the gradual reduction of said space size caused by fluid pressure within said first chamber exceeding fluid pressure within said second chamber and fluid flowing through said fluid-flow restricting vent, said flow path including a groove defined by said first piston element about the periphery of said recess, said groove and said aperture being so configured as to be in continuous at least partial registry during gradual displacement of said aperture.

2. The shock absorber of claim 1 wherein said piston rod at least partially defines said vent.

3. The shock absorber of claim 2 wherein said piston rod defines a throughbore extending between said second chamber and said space, said shock absorber additionally comprising check valve means in operative association with said piston rod, said check valve means adapted to establish communication between said second chamber and space when the pressure of fluid in the second chamber exceeds the pressure of fluid in the first chamber and adapted to close off said communication when the pressure of fluid in the first chamber exceeds the pressure of fluid in the second chamber.

4. The shock absorber of claim 1 including biasing means urging said second piston element toward said first chamber whereby the pressure of the fluid in said first chamber must overcome the resistance of said biasing means to reduce the size of said space.

5. The shock absorber of claim 1 wherein said aperture varies in size in the direction of movement of said second piston element relative to said first piston element.

6. The shock absorber of claim 5 wherein said aperture has a generally wedge-shaped configuration and wherein the narrow end of said generally wedge-shaped configuration is oriented in the direction of said first chamber.

7. The shock absorber of claim 1 wherein said second piston element defines a plurality of apertures in at least partial registry with said groove during displacement of said apertures.

8. The shock absorber of claim 2 wherein at least some of said apertures are of different lengths.

9. A method of controlling movement of a piston in a predetermined direction within a shock absorber cylinder containing fluid, said piston element defining first and second chambers within said cylinder on opposed sides of said piston, said piston including first and second relatively movable piston elements, said first piston element being fixedly mounted relative to said piston rod, movable with said piston rod, and defining a recess, said method comprising the steps of:
   disposing said second piston element in said recess to define a variable-sized space within said recess with said first and second piston elements;
   flowing a first portion of said fluid through a passageway formed in the piston from said first chamber to said second chamber;
   accommodating a second portion of said fluid in the variable-sized space formed in said piston by said first and second piston elements;
   during said flowing step, gradually diminishing the size of said space by exerting fluid pressure in said first chamber on said second piston element to gradually move said second piston element within said recess toward said piston rod and relative to said first piston element to pressurize said second fluid portion;
   simultaneously with the step of flowing said first fluid portion through said passageway, flowing at least some of said pressurized second portion through a continuously open fluid-flow restricting vent formed in said shock absorber at a location spaced from the passageway from said space and to said second chamber to control the rate of said gradual diminishment of said space size; and responsive to gradual diminishment of the size of said space, gradually changing the effective size of said passageway to control the flow of said first fluid portion, said passageway including a groove in one piston element and at least one aperture in the other piston element, the step of gradually changing the effective size of the passageway being carried out by maintaining said aperture and said groove in continuous at least partial registry and gradually moving said aperture relative to said groove.

* * * * *